United States Patent Office 3,479,303
Patented Nov. 18, 1969

3,479,303
PROCESS FOR THE PRODUCTION OF MOLDED FOAM BODIES OF POLYESTERS
Helmut Wieschollek and Walter Gumlich, Marl, Germany, assignors to Chemische Werke Huls Aktiengesellschaft, Marl, Germany, a corporation of Germany
No Drawing. Filed July 2, 1965, Ser. No. 469,318
Claims priority, application Germany, July 25, 1964, C 33,504
Int. Cl. C08g 53/08, 51/70
U.S. Cl. 260—2.5      4 Claims

ABSTRACT OF THE DISCLOSURE

The invention relates to a process of making light-weight molded bodies of polyester which comprises mixing a solution of a hardening accelerator and an acid to an emulsion comprising an unsaturated polyester resin, copolymerizable monomer, a peroxide catalyst, a blowing agent and water which results in foaming and hardening of the resin.

---

It is known that molded foam bodies can be made from polyester molding materials by the addition of water and an amine accelerator to a mixture of an unsaturated polyester, a copolymerizable vinyl compound, an organic peroxide, a solid leavening agent (blowing agent) such as an alkali metal carbonate and an organic acid, with or without filler material (British Patent No. 652,770). Such a process has the disadvantage that only when aluminium is used as the filler is a foam product produced the density of which approaches the lower limit indicated. The aluminum acts not only as filler but also as an additional leavening agent as a result of the hydrogen liberated by its reaction with the acid in the reaction mixture. This production of foam bodies by the liberation of hydrogen has the disadvantage that, due to the explosiveness of hydrogen-air mixtures, special working conditions must be employed. If the process is carried out without aluminium the resulting porous bodies have a density near the upper limit of 0.72 g./cm.$^3$. Foam material of such density is however not of interest to the consumer.

It is also known in a similar mixture which moreover contains an amine accelerator to effect the reaction of the gas forming components by means of water (French Patent No. 1,247,434). By this process bodies of non-homogeneous structure are formed that easily disintegrate.

German Patent No. 1,150,524 discloses a process in which a water-in-oil emulsion is formed of the mixture of unsaturated polyester, copolymerizable vinyl compound, catalyst and water and this is hardened if necessary with the addition of an accelerator and/or the application of elevated temperature. After expelling the water out of the hardened mass the product is a fine-pored foam body having a density of 0.6.

U.S. Patent No. 2,505,353 discloses the polymerization of an unsaturated polyester resin in an emulsion in water containing silica gel. The product after drying is finely porous and has a density of from 0.45 to 0.73.

In another known process a mixture of unsaturated polyester, copolymerizable vinyl compound, a carbonate and a peroxide catalyst is mixed with a mixture of an aqueous organic acid and an amine (French Patent No. 1,154,845). This process gives a foam body having very little strength. In this process the foaming generally starts vigorously immediately upon the mixing of the components and this is a substantial disadvantage in the technical use of the process.

In spite of all of these processes it is not possible up to the present time to obtain satisfactory results in the production of foam bodies of the polyester type.

It has now been found that foam bodies can be made by hardening an emulsion of an unsaturated polyester resin, copolymerizable monomer vinyl compound and water containing a peroxide catalyst such as benzoylperoxide, a blowing agent which liberates carbon dioxide by the action of an organic acid and, if necessary, an emulsifying agent, provided that there is added to the emulsion a solution of an organic acid or an organic acid anhydride and a tertiary amine in a solvent that is soluble in the unsaturated polyester resin.

The foam bodies obtained by this method are mostly of the open cell type and have densities within the range of about 0.03–0.1 and pores having diameters chiefly within the range from 0.1 to 5 mm. The bodies are distinguished by their uniform structure and strength as compared with products obtained by known technical processes. The low density and uniform pore size are especially advantageous in the use of the material as a separating and connecting layer. Essential for the technical use of the material is the delayed starting of the gas formation which, in the case of large emulsion batches, permits transfer of the reaction mixture from the mixing vessel to the molds.

The unsaturated polyesters can be made in the known way from ethylene-$\alpha,\beta$-dicarboxylic acids such as fumaric and maleic acids, or their anhydrides and the divalent alcohols such as ethylene glycol, diethyleneglycol, 1,3-butene diol and propylene glycol. A part of the ethylenically unsaturated dicarboxylic acid can be substituted by saturated acids such as succinic acid, adipic acid and phthalic acid and their anhydrides. The polyesters can also be modified by the addition of monocarboxylic acids such as abietic acid and/or tri- or polyvalent carboxylic acids such as tricarballylic acid or alcohols.

Styrene is especially suitable as the copolymerizable monomer vinyl compound but monomer mixtures such as mixtures of styrene with acrylonitrile, methacrylic acid ester, 2,3-dichlorobutadiene or vinyl acetate can be used. The styrene component of the mixture should be at least 25% by weight thereof. The unsaturated polyester is dissolved in the copolymerizable monomer or monomer mixture. The ratio of polyester to monomer or monomer mixture may vary within a wide range, an advantageous ratio being from 2 to 2.5 to 1.

As the hardening system a diaroyl or diacyl peroxide is used and preferably benzoyl peroxide. As accelerator component the known tertiary amines such as N-dimethyl aniline and N-dimethyl-p-toluidine are suitable. Other peroxide-accelerator systems such as ketone- or hydroperoxide/cobalt compound mixtures are not suitable.

As blowing agents the carbonates of the alkali metals and alkaline earth metals such as sodium carbonate, sodium bicarbonate, ammonium bicarbonate and calcium carbonate which react with organic acids to liberate carbon dioxide may be used in amounts within the range from 10 to 30% by weight based upon the weight of the unsaturated polyester resin.

Suitable acids are the aqueous solutions of the lower aliphatic acids such as formic acid, acetic acid and propionic acid and the unsaturated acids such as acrylic acid and maleic acid. Acetic acid anhydride or preferably maleic acid anhydride may be used if neessary together with a catalytic amount of sulfuric acid. Mixtures of acid components also can be used. The acid component need not be used in stoichiometric ratio to the carbonate but may be used in the ratio of from 0.5 to 2:1 of the chemically equivalent amount.

Styrene is especially suitable as the solvent for the acid component and the amine accelerator. It is advantageous to use a solution of maleic acid anhydride and N-dimethylaniline or N-dimethyl-p-toluidine in styrene. Other suitable solvents are α-methylstyrene, methacrylic acid ester, chloroform and toluene. It is advisable to use only enough solvent to dissolve the mixture of acid or anhydride and tert. amine.

The process is carried out so that an emulsion is first formed of the peroxide-containing unsaturated polyester resin to which a blowing agent has been added by the addition of water and if necessary with cooling. The amount of water used to produce the emulsion amounts to at least 25% by weight and preferably 80–100% by weight based upon the weight of the unsaturated polyester resin. Emulsifiers may be added to the emulsion e.g. zinc stearate, in amounts from about 1% to about 3% by weight based upon the weight of the unsaturated polyester resin. The addition of the solution containing the acid or acid anhydride and tertiary amine to the emulsion takes place generally at room temperature e.g. with stirring in order to obtain the finest possible subdivision thereof in the emulsion. In order to increase the solubility of, for example, maleic acid anhydride and tert. amine in the solvent styrene the latter may be heated to about 35° C. The water-polyester resin-emulsion is not broken by the addition of the acid component. After the addition of the solution to the emulsion the foam sets with the simultaneous hardening of the polyester molding material. The water in the molded body can be removed in a heating cabinet or by evaporation at room temperature. A slight shrinkage occurs when the foam is dried.

The porosity and density of the product can be varied by varying the amount of blowing agent or emulsifier. It is also influenced by the composition of the polyester and polymerizable monomer mixture. The pores are mostly open and uniformly distributed and have diameters within the range from 0.1 to 10 mm. The foams are stable and at room temperature are mostly hard but may be elastic depending upon the polymerizable monomer component. For instance by the use of a mixture of styrene and 2,3-dichlorobutadiene a soft foam body can be obtained. Also the structure of the unsaturated polyester extensively determines the properties of the foam. Thus by the inclusion of long chain diols such as the $C_{36}$ diol described in application Ser. No. 363,984 in the names of Walter Gumlich, Horst Krämer and Helmut Wieschollek or dicarboxylic acids such as adipic acid or sebacic acid soft, elastic foams are produced. Foam bodies the unsaturated polyester component of which contains di-hydroxymethyl-tricyclo - [5,2,1,0$^{2,6}$] - decane (Dicidol), tall resin acid or a large proportion of fumaric acid are conspicuous by their great shape stability when heated. The properties of the foam bodies can be further affected by additions such as "Aerosil" [1], antimony trioxide, carbon black, cellulose, chloroparaffine, acetobutyrate and softeners such as phthalic acid ester or polyglycols. The shaped bodies made as described above can be worked mechanically e.g. sawed or cut. They are eminently suitable for the production of wall and floor tiles, for the production of jackets for containers and for sound and heat insulation.

The invention is further described and illustrated by the following examples.

Production of an unsaturated polyester resin A 3060 g. of fumaric acid, 6350 g. of phthalic acid anhydride, 2410 g. of ethylene glycol and 3570 g. of diethylene glycol and 2 g. of hydroquinone were heated together to 150–200° C. under nitrogen in a condensation vessel until an acid number of 35 was reached. The resulting unsaturated polyester was stirred with 6150 g. of styrene at 120° C. giving an unsaturated polyester resin designated hereinafter by the letter A. This unsaturated polyester resin had a color value according to Gardner of from 1 to 2 and a flow-through time of 250 seconds, measured at 20° C. with a Ford beaker having a 4 mm. nozzle.

Production of an unsaturated polyester resin B

An unsaturated polyester having an acid number of 35 was produced by heating a mixture of 265 g. of fumaric acid, 29 g. of tall resin, 224 g. of dihydroxymethyl-tricyclo-5,2,1,0$^{2,6}$-decane, 153 g. of dipropylene glycol, 14 g. of octanol and 0.2 g. of hydro-quinone in a stirring vessel equipped with a descending cooler as described above and the resulting unsaturated polyester was stirred with 400 g. of styrene to give unsaturated polyester resin B. This product had a color value of 3 according to Gardner and a flow-through time of 200 seconds measured at 20° C. in a Ford beaker having a 4 mm. nozzle.

Production of an unsaturated polyester resin C 178 g. of fumaric acid, 280 g. of adipic acid and 382 g. of diglycol with an addition of 0.02 g. of hydroquinone were, as described above, condensed to form an unsaturated polyester having an acid number of about 35. The condensation product was stirred with 246 g. of styrene and gave an unsaturated polyester resin C having a color value of 2 to 3 according to Gardner and a flow-through time of 250 seconds measured at 20° C. in a Ford beaker having a 4 mm. nozzle.

EXAMPLE 1

5000 g. of the unsaturated polyester resin A was emulsified with 4000 cm.$^3$ of water, 200 g. of 50% benzoyl-peroxide paste and 50 g. of zinc stearate in an open 30 liter vessel by stirring for about 10 minutes and then slowly mixed with 1000 g. of sodium bicarbonate. With the carbonate addition there was a slight liberation of gas. The resulting emulsion at 22° C. was quickly mixed with a solution of 850 g. of maleic acid anhydride and 100 g. of N-dimethylaniline in 850 g. of styrene at 35° C. and the mixture was stirred for 15 seconds. The slightly foaming mixture was transferred to a mold within the next 10 seconds and began therein slowly and uniformly to foam extensively. After a further 70 seconds the foaming process was complete. The maximum hardening temperature of 75° C. was reached in 150 seconds. The resulting foam mass had a volume of about 140 liters. The bulk of the pores had a diameter of from 3 to 7 mm. The density of the foam after drying in a warming oven was 0.055.

EXAMPLE 2

33 g. of unsaturated polyester resin A was emulsified with 27 g. of water, 0.33 g. of zinc stearate and 1.33 g. of a 50% benzoyl peroxide paste in a stirring vessel and the emulsion was mixed with 6.66 g. of sodium bicarbonate. A solution of 5.66 g. of maleic acid anhydride and 0.3 g. of N,N-dimethyl-p-toluidine in 5.66 g. of styrene at 35° C. was stirred into the emulsion which had a temperature of about 24° C. The reaction mixture was foamed in a mold under reduced pressure (about 200 mm. Hg). The hardened foam after drying had a density of 0.03. The pore diameter was 2–5 mm.

EXAMPLE 3

2458 g. of unsaturated polyester resin A is mixed with 42 g. of "Aerosil" powder and, as in Example 1, after the addition of 2000 cm.$^3$ of water, 62.5 g. of zinc stearate and 75 g. of 50% benzoyl peroxide paste, is emulsified within 10 minutes. After the addition of 500 g. of sodium bicarbonate a solution of 425 g. of maleic acid anhydride and 37.5 g. of N-dimethylaniline in 425 g. of styrene at 35° C. is stirred into the emulsion at 23° C. within 15 seconds. The result is a foam body amounting to 70 liters having a pore size of 1–3 mm. and a density after drying of 0.054.

---

[1] Trade name for extremely fine powdered pure silicic acid, particle size: 15–23 mμ.

EXAMPLE 4

An emulsion of 100 g. of the unsaturated polyester resin A, 80 g. of water, 1 g. of zinc stearate and 4 g. of a 50% benzoyl peroxide paste was mixed with 20 g. of sodium bicarbonate. A solution of 20 g. of acrylic acid and 2 g. of N-dimethylaniline in 10 cm.$^3$ of styrene was mixed into the emulsion at 23° C. The pores of the resulting foam body had a diameter of 2–5 mm. and the density of the foam body was 0.081.

EXAMPLE 5

600 g. of the unsaturated polyester resin B, 480 g. of water, 24 g. of a 50% benzoyl-peroxide paste and 6 g. of zinc stearate were emulsified in a mixing apparatus. 185 g. of this emulsion was stirred in a stirring vessel with 20 g. of sodium bicarbonate. A solution of 17 g. of maleic acid anhydride and 2 g. of N,N-dimethyl-p-toluidine in 17 g. of styrene at 32° C. was introduced into the emulsion at 25° C. with stirring within 10 seconds. The dried foam product had a density of 0.07 and a pore diameter of 3–5 mm. The bending strength of the product according to DIN 53 424 was 132° and the compression stress according to DIN 53 424 was 142°.

EXAMPLE 6

An emulsion of 100 g. of unsaturated polyester resin C, 1 g. of zinc stearate, 4 g. of a 50% benzoyl peroxide paste, 80 g. of water and 20 g. of sodium bicarbonate at 28° C. was foamed with a solution of 17 g. of maleic acid anhydride and 2 g. of N-dimethylaniline in 17 g. of styrene at 30° C. as described in Example 3. The dried foam had a density of 0.09 and was weakly elastic. Its pore size was 0.5–5 mm.

We claim:

1. Process for the production of a foam body of an unsaturated polyester resin which comprises mixing a solution of a tertiary amine hardening accelerator selected from the group consisting of N-dimethyl aniline and N-dimethyl-p-toluidine and a member selected from the group consisting of lower aliphatic acids, acrylic acid, maleic acid, acetic acid anhydride and maleic acid anhydride in a solvent that is soluble in said unsaturated polyester resin with an emulsion comprising said unsaturated polyester resin, a copolymerizable monomer vinyl compound, a peroxide catalyst, a blowing agent which liberates carbon dioxide by reaction with said member and organic acid anhydrides and water, and hardening the resulting foam.

2. Process as defined in claim 1 in which said copolymerizable monomer vinyl compound is styrene.

3. Process as defined in claim 1 in which said peroxide catalyst is benzoyl peroxide.

4. Process as defined in claim 1 in which said emulsion contains zinc stearate.

References Cited

UNITED STATES PATENTS 3,227,665   1/1966   Fourcade et al.
3,260,688   7/1966   Watanabe et al.

FOREIGN PATENTS 652,770   5/1951   Great Britain.

MURRAY TILLMAN, Primary Examiner

M. FOELAK, Assistant Examiner

U.S. Cl. X.R.

260—9, 8, 31.8, 33.2, 40, 78